Figure 1:
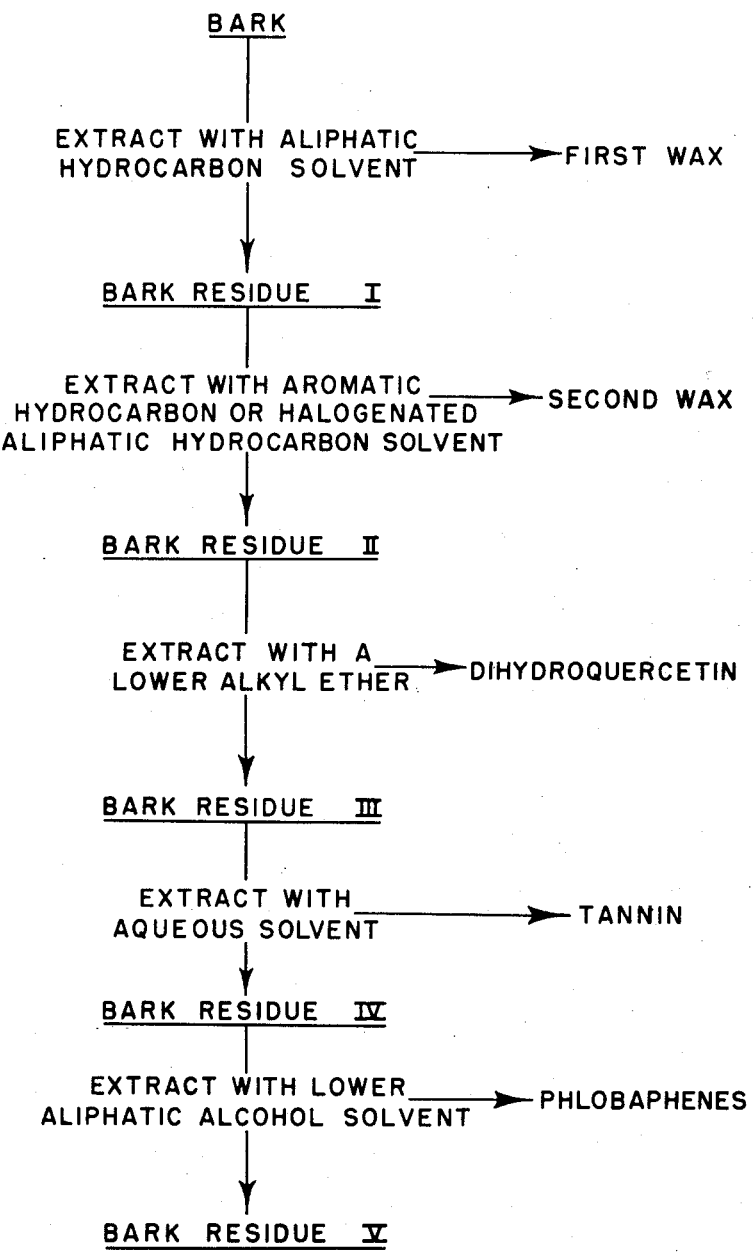

Patented Dec. 15, 1953

2,662,893

UNITED STATES PATENT OFFICE 2,662,893

EXTRACTION OF VALUABLE PRODUCTS FROM BARK

Ervin F. Kurth, Corvallis, Oreg., assignor to State of Oregon, acting by and through the Oregon State Board of Forestry Application March 28, 1950, Serial No. 152,482

42 Claims. (Cl. 260—345.2)

The present invention relates to a process for the separation of valuable wax products from the barks of trees in which they are contained, such products comprising waxes, dihydroquercetin, tannins, and phlobaphenes.

This application is a continuation-in-part of the copending application, Serial No. 136,622, filed January 3, 1950, by Ervin F. Kurth, the inventor herein, for Extraction of Valuable Products From Bark, now abandoned.

One of the waxes obtainable by the practice of the present invention comprises a first wax product which is soluble in the lower aliphatic hydrocarbon solvents such as hexane. It is composed of a mixture of higher fatty acids and fatty acid esters, principally lignoceryl alcohol, lignoceric acid, ferulic acid, lignoceryl lignocerate, and lignoceryl ferulate. This wax is light in color and is similar in appearance and properties to beeswax. It is the full equivalent of the latter for many uses including the manufacture of floor waxes, candles, wax emulsions, polishes, coating and moisture proofing agents, cosmetic creams and the like.

The second wax product obtainable by the practice of the present invention is insoluble in hexane and the other lower aliphatic hydrocarbon solvents, but soluble in the normally liquid aromatic hydrocarbon solvents and the lower halogenated aliphatic hydrocarbons. It has a more complex, chemical composition than does the first wax product, being composed insofar as is known of phenolic-fatty acid complexes. It is light brown in color and is useful in general for applications where a colored wax is suitable, for example in the formulation of moisture sealing compositions. From about 3.5% to about 6.0% by weight of the first wax product and about 3% by weight of the second wax product are obtainable from the bark of the Douglas fir.

The dihydroquercetin which is obtainable by the process of the present invention is a new compound. It is the dihydro derivative of quercetin (tetrahydroxyflavanol or 3,3',4',5,7-pentahydroxyflavanone) and has the following formula:

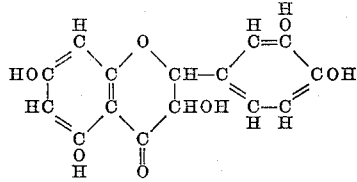

It is obtainable from the bark of the Douglas fir in yields of from 5 to 8% by weight and is useful as a raw material in the synthesis of organic compounds of value as pharmaceutical and biological products.

The tannin which is obtainable by the process of the present invention as applied to the bark of the Douglas fir is a phlobatannin or condensed tannin. It is readily soluble in water and contains less acid and sugar than do most other natural tanning materials. It is, however, useful as a tanning agent, producing leather, which is light in color, flexible, and well plumped. It is obtainable from Douglas fir bark in yields of from 7% to 18% by weight.

The phlobaphenes which may be produced as products of the presently described process are resinous materials phenolic in character which are useful as extenders for plastics and synthetic resins, and as adhesives, since they have setting properties. They are obtained from the bark of the Douglas fir in yields of about 6% by weight.

Figure 3:
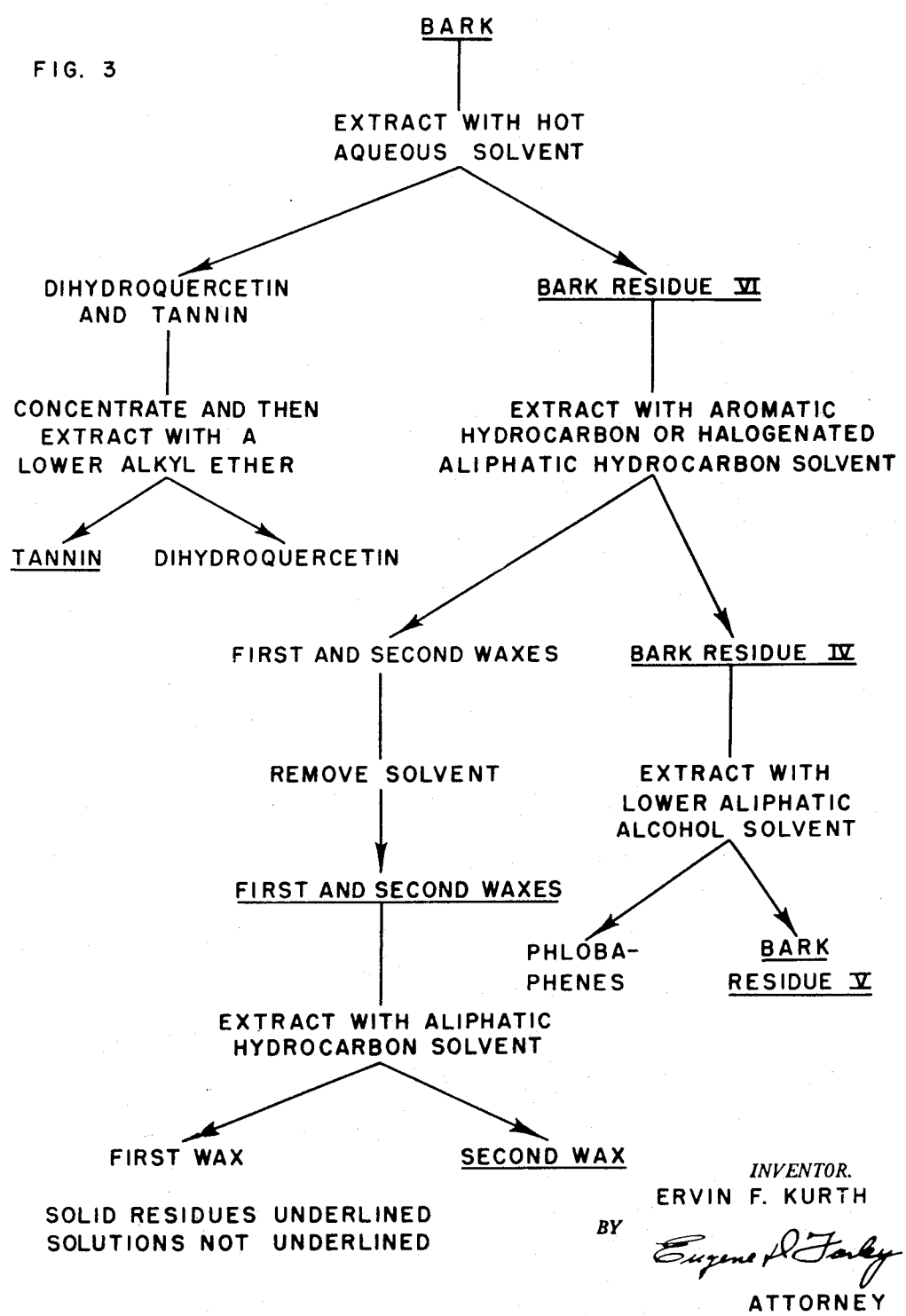
Figure 4:
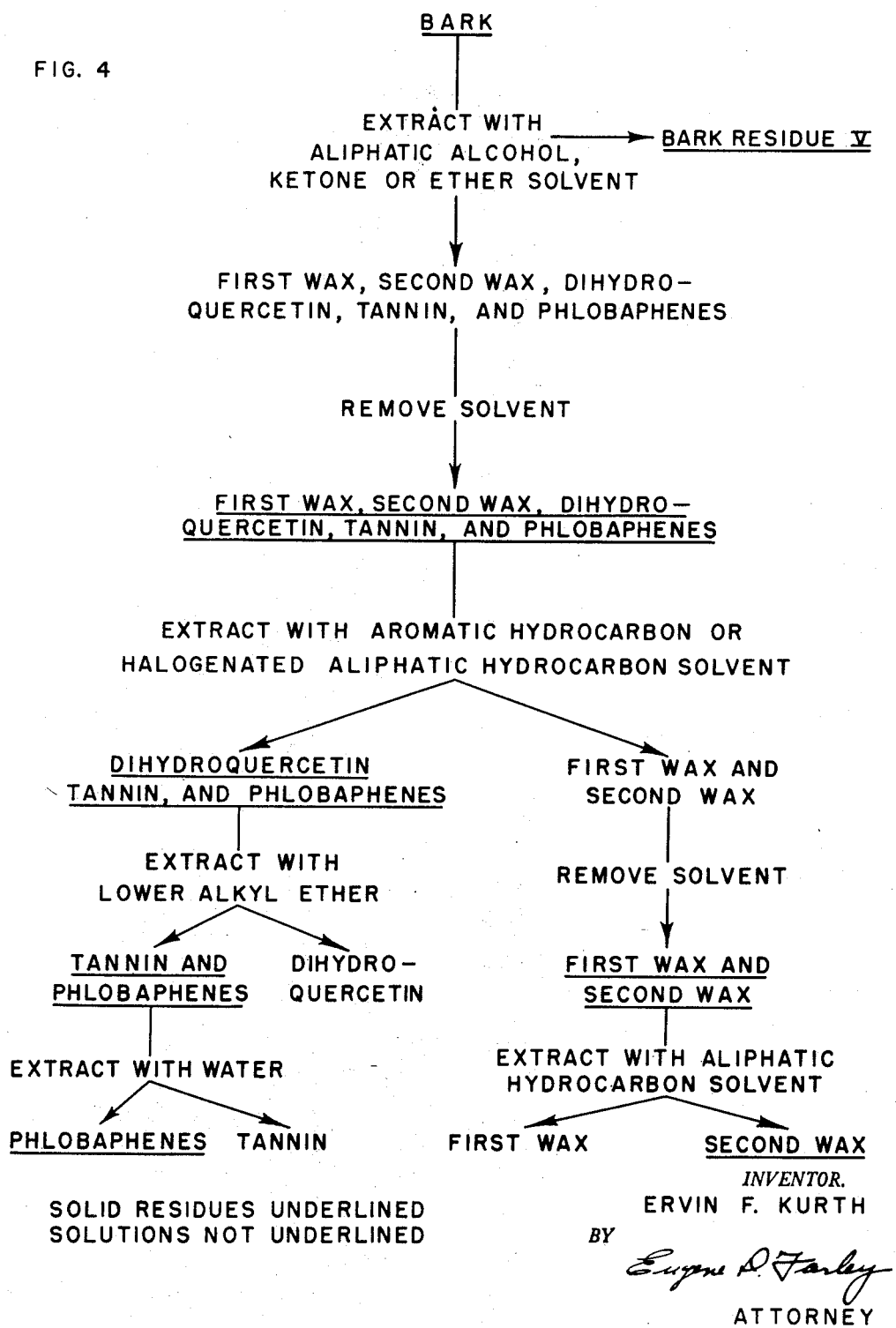
Figure 5:
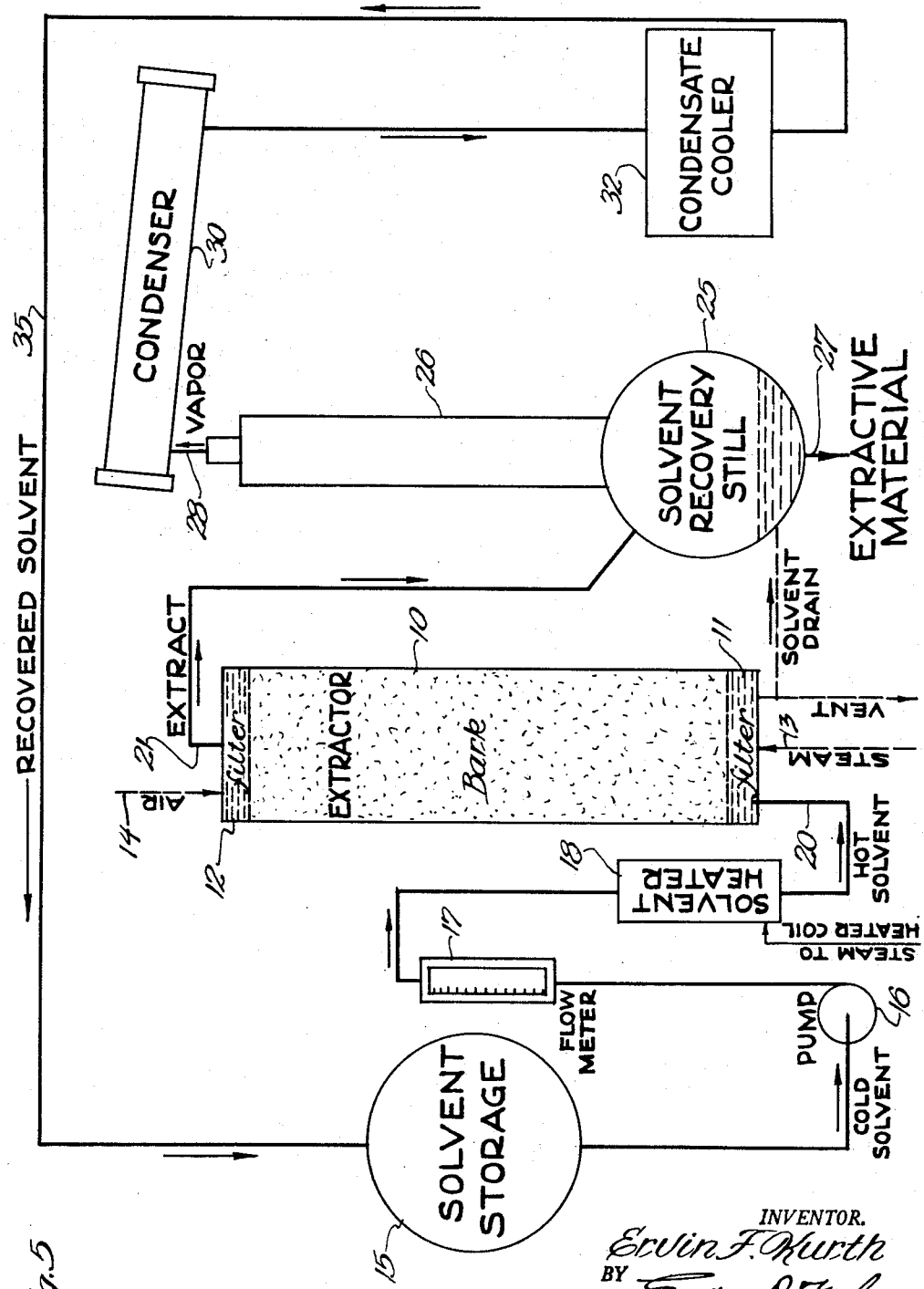

The present invention rests upon the discovery that the foregoing materials may be separated from each other and from the bark by treatment of the latter with a system of solvents, calculated to extract selectively from the complex mixture of substances comprising the bark the particular products it is desired to isolate. In general, suitable organic solvents are employed for the separation of the wax products from the bark, while aqueous solvents may be employed to separate the dihydroquercetin and the tannin therefrom. A specific solvent then is employed for the removal of the phlobaphenes when this is desired. The system of solvents employed is somewhat variable depending upon such factors as which of the above products it is desired to extract from the bark, the order of their separation, etc. Thus the present invention is disclosed herein with reference to four suitable procedures which are outlined in the drawings, wherein:

Figures 1 to 4, inclusive, are flow plans illustrating processes for the production of valuable products from the bark of trees in accordance with the present invention; and Figure 5 is a flow diagram illustrating suitable equipment for use in the practice of the present invention and its application thereto.

The procedures illustrated in Figures 1 to 4 are applicable to the barks of trees of species containing recoverable quantities of any of the above constituents, i. e. waxes, dihydroquercetin, tannin, and phlobaphenes. It is particularly applicable to the barks of the softwood species of trees such as Douglas fir, ponderosa pine, and Jeffery pine, these being available commercially in very large quantities and containing substantial percentages of extractive materials.

The bark used as a raw material preferably may have a substantial moisture content without interfering with the extraction procedures, a fact which is surprising in view of the fact that water immiscible solvents are used in certain of the operations. It is preferred to use wet bark since this eliminates difficulties which might be encountered by the formation of dust during the preliminary milling operation. It also eliminates the formation of a large proportion of fines which tend to swell in the extraction vessels, plug the screens, and hinder the free passage of the selected solvents through the bark during the extraction. Therefore, although bark having a moisture content within the broad range lying between completely dry bark and bark which is saturated with water may be used, it is preferred to employ bark having a moisture content of between about 15% and about 60% by weight. This has an important bearing upon the commercial application of the process, since it enables the use of green bark as a raw material without a preliminary drying operation which would add materially to the cost of the process.

Thus the bark having a moisture content of between about 15% and about 60% by weight, may first be subjected to a preliminary operation in which it is reduced in size to a condition approximating hog fuel. It then is placed in a hammer mill or its equivalent for reduction to the form of particles preferably having a size such that the greater proportion will pass a ⅜ inch screen, but about 85% will be retained by a 60-mesh screen. Alternatively, it may be separated mechanically into its component physical fractions such as cork particles, bast fibers, and bark powder comprising the more readily pulverizable constituents of the bark, it being understood that, as used herein, the term "bark" has specific reference to and is inclusive of such fractions, severally or combined, as well as of whole bark. The bark or any fractions thereof then are ready for processing in any of the various procedures described herein.

PROCEDURE OF FIGURE 1

The procedure outlined in Figure 1 is designed to remove from the bark a series of individually useful products. Thus there are obtained in the order named a first wax product comprising principally lignoceryl lignocerate, a second wax product of the phenol-fatty acid class, dihydroquercetin, tannin, and phlobaphenes. To obtain these various products, the bark in particle form first is treated with a solvent comprising a lower aliphatic hydrocarbon, preferably petroleum naphtha, under conditions such as to dissolve the first wax product without dissolving the other constituents of the bark. This results in the formation of a solution containing the first wax product, and a first bark residue designated Bark Residue I in the flow plan. The solution of the wax is separated from the bark residue by filtration, decantation, percolation or other suitable method. The solvent then is removed by distillation or stripping with steam, thus forming the solid wax as a product.

Next the bark residue remaining after the removal of the first wax product is stripped with steam, if desired, for removal of any residual aliphatic hydrocarbon. It then is treated with a selective solvent for the second wax product. Suitable solvents for this purpose comprise those selected from the class consisting of the normally liquid aromatic hydrocarbons, i. e. the aromatic hydrocarbons such as benzene which are liquid at normal temperatures and pressures, and the lower, halogenated aliphatic hydrocarbons such as trichlorethylene. This treatment results in the solution of the second wax product in the solvent, leaving behind a solid bark residue, designated Bark Residue II in the flow plan. The solution is separated from the bark residue and distilled or stripped with steam to separate the solvent from the wax product, which thus is obtained as a solid.

The bark residue remaining after the separation of the first and second wax products then is treated for the removal of dihydroquercetin. A suitable treatment comprises extracting the bark residue with a solvent comprising a lower alkyl ether, e. g. diethyl ether, in which the dihydroquercetin is selectively soluble. This results in the formation of a solution of dihydroquercetin in the lower alkyl ether solvent, and a solid residue, Bark Residue III. The ether solution of dihydroquercetin then is treated for the removal of the solvent, as by distilling the same therefrom, this leaving the dihydroquercetin as a solid product.

Next Bark Residue III remaining after the removal of the waxes and the dihydroquercetin is treated for separation of its tannin content. For this purpose, an aqueous solvent, preferably hot water, is employed. Upon extraction of the bark residue with the aqueous solvent, the tannin is dissolved selectively leaving behind an undissolved bark residue, Bark Residue IV. The tannin solution is useful per se as a tanning agent for leather and other purposes without further treatment.

Next the bark residue remaining after the removal of the waxes, the dihydroquercetin, and the tannin is treated for recovery of its phlobaphenes content. This is accomplished by treatment with a lower aliphatic alcohol solvent, e. g. ethyl alcohol, which selectively dissolves the phlobaphenes. The resulting phlobaphenes solution in alcohol may be distilled or otherwise treated for removal of the solvent, thereby obtaining the phlobaphenes as a solid, resinous product.

There remains as a product of the foregoing extraction procedures, a bark residue, Bark Residue V, the extractive content of which has been removed substantially completely. It consists principally of cork, lignin (bark acids) and cellulosic fibers and is useful in applications where these products are of value.

PROCEDURE OF FIGURE 2

Figure 2:
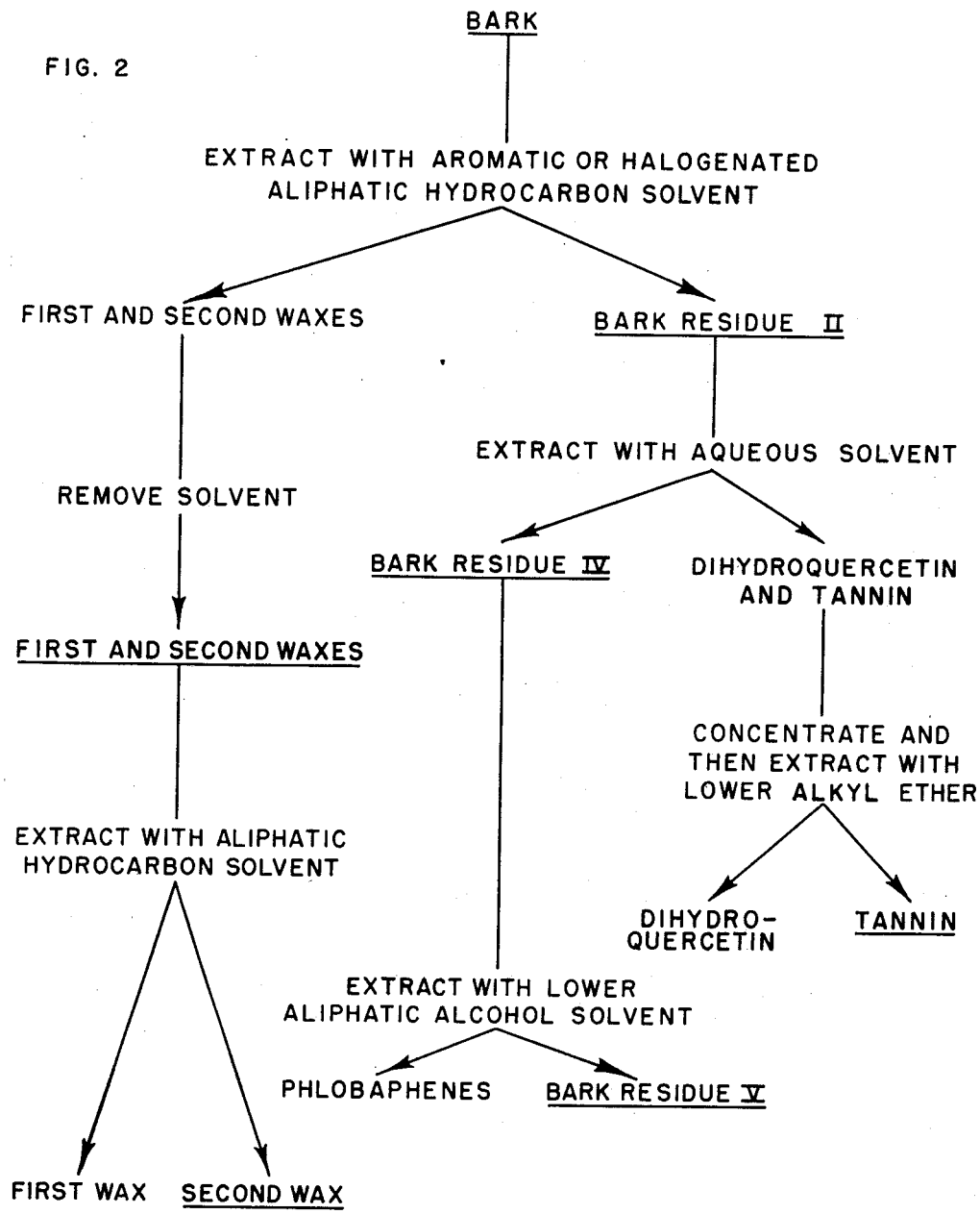

The procedure for the production of valuable products from bark which is illustrated in Figure 2 is of particular interest because by only two, easily effectuated extraction operations those constituents of the bark which are presently of greatest commercial value may be separated in useful form. Thus by a first extraction step, the wax content of the bark may be removed. Then by a second extraction, the tannin and dihydroquercetin may be removed, this mixture being useful in tanning operations without further treatment.

The first step in the procedure comprises treating the bark with a selective solvent for the waxes contained therein. Such a solvent comprises at least one member of the class consisting of a normally liquid aromatic hydrocarbon solvent, e. g. benzene, and the lower halogenated aliphatic hydrocarbon solvents, e. g. trichlorethylene. This dissolves preferentially both the first and second wax products of Figure 1. The solution of waxes then may be separated from the bark residue, Bark Residue II, and distilled or stripped with steam for removal of the solvent. This results in the formation of a solid mixture of the first and second wax products which may be used as a valuable commercial product without further treatment or, if desired, treated further for the separation of its two component waxes. In the latter case, it is extracted with a selective solvent for the first wax product, such a solvent comprising a lower aliphatic hydrocarbon solvent, e. g. petroleum naphtha. This forms a solution containing the first wax product, leaving undissolved the second wax product. The solution of first wax product then may be distilled for removal of the solvent, leaving the wax as a solid residue.

Next the bark residue remaining after removal of the waxes may be treated with a selective solvent for removal of its content of dihydroquercetin and tannin. These two materials being soluble in aqueous solvents, the bark residue may be extracted with hot water under conditions calculated to dissolve the water soluble components substantially completely. The resulting aqueous solution then is separated from the bark residue. As indicated above, it is useful as a tanning liquor without further treatment. However, if it is desired to separate the dihydroquercetin from the tannin, the aqueous solution of the two materials may be concentrated, preferably by evaporation under diminished pressure, and then extracted with a selective solvent for the dihydroquercetin. The concentration may be carried on until the total solids content of the solution (extract) has reached a value of up to about 50% by weight, care being exercised to prevent conversion of substantial quantities of the tannin to the resinous phlobaphenes. The concentrated solution then is extracted with a selective solvent for the dihydroquercetin, such solvent comprising a lower alkyl ether, e. g. diethyl ether. The resulting solution of dihydroquercetin in ether then may be separated from the residue comprising the tannin, and the solvent removed by distillation for recovery of the dihydroquercetin in solid form.

The bark residue remaining after the removal of the waxes, the dihydroquercetin and the tannin, i. e. Bark Residue IV, may be treated, if desired, for the recovery of its content of phlobaphenes. This operation comprises treatment of the bark residue with a selective solvent for the phlobaphenes, this comprising a lower aliphatic alcohol solvent, e. g. ethyl alcohol. The resulting solution of phlobaphenes in alcohol then may be separated from the bark residue, Bark Residue V, and the solvent removed for recovery of the solid phlobaphenes. Bark Residue V thus is obtained as a solid product from which substantially all of the extractive materials originally present in the bark have been removed. It consists substantially of cork cells, lignin and cellulosic fibers and corresponds to Bark Residue V of Figure 1.

PROCEDURE OF FIGURE 3

The procedure of Figure 3 is applicable to the situation in which it is desired to extract dihydroquercetin and tannin as the primary products. The first operation comprises treating raw bark, preferably after a preliminary disintegrating operation, with a selective solvent for the dihydroquercetin and tannin. Thus the raw bark is treated with a hot aqueous solvent which dissolves the dihydroquercetin and the tannin, but does not dissolve the waxes or the phlobaphenes.

The resulting aqueous solution then may be separated from the bark residue, Bark Residue VI. It may be used without further treatment as a tanning agent; or, if it is desired to separate the disydroquercetin as a separate product, it may be concentrated as described above with reference to Figure 2, and then extracted with a lower alkyl ether. This solvent selectively dissolves the dihydroquercetin, leaving the tannin as a residual aqueous liquor. The ether solution may be distilled or otherwise treated for separation of the dihyroquercetin as a solid product.

The bark residue from which the dihydroquercetin and the tannin have been removed then may be treated for separation of its wax content. Such treatment may comprise extraction with a selective solvent comprising at least one member of the class consisting of the normally liquid aromatic hydrocarbons and the lower halogenated aliphatic hydrocarbons, benzene and trichlorethylene being representative of these two classes of solvents. The solution of waxes which results then is separated from the bark residue and the solvent removed to recover a solid mixture of the two waxes.

This mixture may be applied to many uses without further treatment or, if desired, may be processed for separation into its component waxes. In the latter case, it is extracted with a selective solvent for the first wax product, i. e. with a lower aliphatic hydrocarbon solvent such as petroleum naphtha. The resulting solution of the first wax product then is separated from the residual solid second wax product, and the solvent removed for recovery of the solid first wax product.

Bark Residue IV remaining after removal of the dihydroquercetin, tannin, and the waxes may be processed, if desired, for recovery of the phlobaphenes which it contains. Thus it may be extracted with a selective solvent for the phlobaphenes comprising a lower aliphatic alcohol, e. g. ethyl alcohol. This dissolves the phlobaphenes, leaving undissolved Bark Residue V which, as in the case of the procedures of Figures 1 and 2, consists principally of cork cells, lignin and cellulosic fibers. The phlobaphenes may be recovered in the solid state from the alcoholic solution in which they are contained by evaporation of the solvent as above described.

PROCEDURE OF FIGURE 4

The procedure outlined in Figure 4 is useful where it is desirable to remove from the bark its entire content of extractives, in the initial stage of the process. This might be desirable, for example, where it is wished to separate the extractives from each other at a point distant from the source of the bark, thereby saving the expense of transporting the bark. In this embodiment, the bark is treated with at least one solvent of the class consisting of the lower aliphatic alcohols, the lower aliphatic ketones, and the lower aliphatic ethers. This treatment dissolves the waxes, the dihydroquercetin, and the tannin which is contained in the bark, leaving as a residue, Bark Residue V, from which substantially all the valuable extractive materials have been removed. The resulting solution which contains the waxes, the dihydroquercetin, the tannin, and the phlobaphenes then is distilled or stripped with steam for removal and recovery of the solvent, thus forming as a solid product a mixture of the above materials.

This mixture then is extracted with a selective solvent for the waxes, such solvent comprising at least one member of the class consisting of the aromatic hydrocarbons, e. g. benzene, and the lower halogenated aliphatic hydrocarbons, e. g. trichloroethylene. This treatment forms a solution of the first and second waxes in the selective solvent, leaving as a solid residue the undissolved dihydroquercetin, tannin, and phlobaphenes. The wax solution may then be distilled for recovery of the solvent and separation of the solid wax mixture as a product. If desired, the wax mixture may be extracted with a selective solvent for the first wax, using a lower aliphatic hydrocarbon solvent such as petroleum naphtha, leaving the second wax as a solid residue. The hydrocarbon solution of the first wax then may be distilled for recovery of the solvent and separation of the first wax as a solid product.

The solid mixture of dihydroquercetin, tannin, and phlobaphenes may be further processed, if desired, for separation of these components. Thus it may be extracted with a selective solvent for the dihydroquercetin comprising a lower alkyl ether, e. g. diethyl ether. This dissolves the dihydroquercetin, leaving as a solid residue the tannin and phlobaphenes. Distillation of the solvent from the solution results in the separation of solid dihydroquercetin as a product, while leaching of the solid residue with warm water results in the separation of the tannin (soluble) from the phlobaphenes (insoluble).

Equivalents

Although in the above discussion the selective solvents employed in the process of the present invention have been described generally with reference to solvent classes, it will be apparent to one skilled in the art that, within each class, there are a substantial number of individual solvents which may be employed individually or in admixture with each other in the practice of the present invention. For example, the lower aliphatic hydrocarbon solvents employed in the separation of the first wax product from the other constituents of the bark may comprise, in general, any aliphatic hydrocarbon boiling below about 200° C., preferably below about 125° C. at normal atmospheric pressure. They include, for example, the hexanes, the heptanes, the octanes, the nonanes and the decanes. A preferred solvent of this class is a mixture of hydrocarbons of petroleum origin comprising the naphtha fraction intermediate between petroleum ether and ligroin and boiling at between about 60° C. and about 72° C.

Representative normally liquid aromatic hydrocarbon solvents which may be employed in the separation of the second wax product from the bark by the practice of the present invention comprise those boiling up to about 200° C., preferably up to about 125° C. at normal atmospheric pressure. Illustrative of such solvents are benzene, toluene, ethyl benzene, methyl ethyl benzene, and the xylenes. Aromatic fractions resulting from the refining processes of the petroleum and coal industries and comprising mixtures of aromatic hydrocarbons also may be used.

Typical lower halogenated aliphatic hydrocarbon solvents which may be used for the separation of the second wax product comprise dichloromethane, trichloroethylene, tetrachloroethylene, carbon tetrachloride, chloroform, propyl bromide, isopropyl bromide, n-butyl bromide, sec-butyl bromide, isobutyl bromide, n-butyl chloride, sec-butyl chloride, isobutyl chloride, the amyl chlorides, ethylene chloride, ethylene bromide, and ethylidene chloride.

Lower alkyl ethers which may be used in the separation of the dihydroquercetin by the process of the present invention comprise diethyl ether, methyl ethyl ether, methyl propyl ether, ethyl propyl ether and the dipropyl ethers, e. g. diisopropyl ether.

As has been indicated, a preferred aqueous solvent for the separation of the tannin content of the bark comprises simply hot water. However, minor proportions of additive substances may be dissolved in the water, such as minor proportions of water soluble organic solvents, and inorganic substances, e. g. sodium bisulfite if desirable or necessary to improve the efficiency of the steps whereby the tannin is removed selectively from the other constituents of the bark. Such additives enhance the solvent power of the water and prevent the tannin from separating out as the phlobaphenes.

Equivalent materials which may be employed as selective solvents for the removal of the phlobaphenes from the bark by the presently described process include, in general, the lower aliphatic alcohols such as methyl alcohol, ethyl alcohol, butyl alcohol, isobutyl alcohol, propyl alcohol, isopropyl alcohol, and mixtures thereof.

As equivalents for the aliphatic alcohol, ketone or ether solvents used in the initial extraction step of the procedure of Figure 4, there may be used the alcohol and other solvents specified above, or the lower aliphatic ketones including acetone, methyl ethyl ketone, diisopropyl ketone, and the like. In addition, there may be used alcohol solvents comprising a mixture of alcohol and an aromatic hydrocarbon. The constant boiling mixture formed by ethyl alcohol and benzene is illustrative of such mixtures and is particularly suitable for applicant's purpose.

Operating conditions

Each of the solvent extraction steps comprising the process of the present invention may be carried out batchwise or in continuous operation using a battery of extractors connected in series, the latter usually being preferred for reasons of convenience and economy. In any case, the extracting conditions are such as to remove from the bark the maximum amount of extractive materials in minimum time. The temperature, therefore, is maintained at or near the boiling point of the solvent employed, since at lower temperatures the extraction rates fall off rapidly, particularly when wet bark is the subject matter of the extraction.

Although the extraction operations may be carried out at normal atmospheric pressure, it may be desirable in certain instances to employ superatmospheric pressures of the order of from 35 p. s. i. to about 85 p. s. i. This increases the extraction temperature which may be employed, thereby increasing correspondingly the amount of extractives separated from the bark in a given operating period.

The time of each extraction obviously is dependent upon various factors such as the temperature, the pressure and the character of the particular solvent employed. In general, the extraction is carried on for a period sufficient to dissolve the desired extractive substantially completely.

Similarly the solvent to bark ratio is variable depending upon such operating conditions as the identity of the solvent, the temperature and the flow rate and also upon the nature of the process, i. e. whether it is a percolation or counter-current flow operation. In general, sufficient solvent should be employed to dissolve the particular extractive material concerned within the time period determined upon.

Although various types of extraction and separation equipment may be employed in executing the herein described procedures, a preferred arrangement of equipment designed for continuous extraction is illustrated schematically in Figure 5. As indicated in Figure 5, the bark in particle form is placed in an extractor 10 which preferably is made of stainless steel or other corrosion resistant material and which is provided with filters 11, 12 at the top and bottom. These are of sufficiently fine mesh to prevent the smaller particles of the bark from being carried out of the extractor by the solvent flow. The extractor also is provided with means for the introduction of steam through line 13, and air through line 14.

Solvent is supplied to the extractor from solvent storage tank 15, being pumped cold through pump 16, flow meter 17, to solvent heater 18, where it is heated to the desired temperature. It then passes into the bottom of the extractor through conduit 20.

After passing upwardly through the extractor, the solvent with its content of dissolved extractive materials (e. g. wax) passes out through conduit 21 to a solvent recovery still. This comprises, for example, a steam jacketed kettle 25 with attached fractionating column 26. In the still, the volatile solvent carrying a certain amount of water with it passes upwardly through the fractionating column where the water is condensed and falls back down into the kettle. There, together with the molten wax, it is withdrawn from time to time through line 27. Upon cooling, the wax solidifies, permitting separation of the water by decantation. The vaporized solvent passes out through the top of the fractionating column through line 28 into the condenser 30 where it is condensed. The hot or warm condensate then passes through the condensate cooler 32 and thence through line 35 to the solvent storage tank 15 from which it may be recycled to the extractor in the manner explained above.

Although the foregoing illustrates one mode of operation, alternate methods will suggest themselves to one skilled in the art. For example, the bark may be extracted by a percolation technique wherein solvent is sprayed on the upper surface of bark contained in a suitable column. It then trickles down through the bark removing the extractive materials as it goes. The solvent may be withdrawn from the bottom of the tower and percolated through a further quantity of bark contained in a succession of towers connected in series with each other until a solution containing a high concentration of extractive materials is obtained. In practice, a counter-current system wherein the fresh solvent first contacts the extracted portion of the bark and the spent solvent contacts the unextracted portion of the bark may be used to advantage.

An alternate procedure for recovering the solvent from the solution of extractive materials resulting from treatment of the bark is to pass steam through the solution in a stripping column thereby removing the solvent by steam distillation. The resulting vaporous mixture of solvent and steam then may be condensed and cooled, and the solvent separated from the water in a conventional separator. This procedure is applicable, of course, only in the case where the solvent is substantially immiscible with water.

EXAMPLES

The following examples illustrate the process of the invention.

Example 1

This example illustrates the application of the procedure of Figure 1.

Fifty pounds of bark ground to pass a screen containing ⅜-inch perforations and having a moisture content of about 30% by weight was charged to an extractor of the type illustrated in Figure 5. Hot petroleum naphtha boiling between about 50° C. and about 72° C. ("Skelly Solvent B") at a temperature of about 55° C. to about 60° C. was passed upwardly through the bark in a continuous operation, the solvent with its content of dissolved wax being withdrawn from the extractor, stripped with steam in an evaporator for removal of the wax, and recycled to the extractor. The limit of the extraction was reached after about four hours, after which the wax product designated herein first wax product was removed from the evaporator and cooled.

*Characterization of first wax product.*—The wax obtained as outlined above was characterized by determining its physical properties and chemical composition. The former are given in Table I.

TABLE I

| | |
|---|---|
| Melting point (°C.) | 59–62 |
| Acid number | 30–70 |
| Saponification number | 130–164 |
| Unsaponifiables, percent | 18–30 |
| Hanus iodine number | 18–22 |
| Color | Light yellow to light brown. |

To determine the chemical composition of the above wax, a mixture of 20 grams of the wax was saponified with 20 grams of potassium hydroxide in 300 ml. 70% ethanol by refluxing the mixture for three hours.

Chemical analysis of the wax revealed that it contained approximately 20% by weight lignoceryl alcohol, 60% by weight lignoceric acid, and 20% by weight ferulic acid (4-hydroxy-3-methoxy-cinnamic acid). Phytosterol also was present in relatively minor proportions, and there appeared to be a small amount of oleic acid present. The acid constituents of the mixture were present in both the free and combined states.

It will be apparent from a consideration of its properties and composition that the above wax product is not to be confused with the wax products described in my copending application, Serial No. 18,878, filed April 5, 1948, now Patent No. 2,526,607. The presently described wax product is a native wax, whereas that described in my aforesaid patent application is produced at least in part by the hydrolysis of the wood waste (as opposed to bark) occurring during the production of the hydrolysis lignin from which the wax is extracted. The presently described wax has a substantially higher saponification number (130-164 vs. 73-100) and a substantially lower iodine number (18-22 vs. 26-28) than has the wax product of the aforesaid application. Furthermore the presently described wax comprises principally lignoceryl alcohol, lignoceric acid, ferulic acid and esters thereof, whereas the product of my prior application contains substantial proportions of lower fatty acids and esters, and apparently does not contain ferulic acid.

Next steam was passed through the extractor which contained the bark residue from which the first wax product had been separated in order to remove the residual aliphatic hydrocarbon solvent. Benzene then was passed through the bark continuously in the manner described above at a temperature of about 75° C., and employing a flow rate of 35 gallons per hour and a solvent to bark ratio of 3.1 gallons per pound of bark (dry basis). The solvent containing the dissolved extractive material was passed through a solvent recovery still where the solvent was removed by steam distillation and recycled, while the wax product was withdrawn from the steam distillation chamber.

*Characterization of the second wax product.*— The second wax product obtained as described above had the following physical constants.

TABLE II

| | |
|---|---|
| Melting point (°C.) | 60 to 63 |
| Acid number | 74 |
| Saponification number | 200 to 210 |
| Unsaponifiable content (per cent by weight) | 5 to 7 |
| Color | Brown to red brown |

The second wax product is soluble in benzene, chlorinated hydrocarbon solvents, diethyl ether, hot acetone, and methanol. Although it could not be separated into its principal chemical components as could the first wax product, its chemical character was indicated by the results of the following tests. A methoxyl group determination indicated the presence of 5.43 per cent methoxyl. Methylation with dimethyl sulfate in caustic solution increased the methoxyl content to 10.2 per cent, which indicated the presence of free hydroxyl groups. Refluxing with dilute mineral acids, followed by extraction with hexane gave about 25 per cent of a fatty acid mixture soluble in the hexane, a dark-colored phlobaphene-like residue, and glycerol in the aqueous solution. Recrystallization of the fatty acid mixture (which had a neutralization equivalent of 335) from acetone, gave two fractions. One of the fractions had a melting point of 65 to 67° C. and a neutralization equivalent of 353. The other fraction had a melting point of 69 to 69.5° C. and a neutralization equivalent of 282.8, which are the properties possessed by stearic acid.

On saponification with alcoholic potassium hydroxide solution, there was obtained a fatty acid mixture in about 25% yield, a dark colored ether-insoluble phlobaphene in 24% yield, an ethyl ether soluble acid fraction in 26% yield, unsaponifiable matter in 5% yield, and glycerol. Resin acids were not found and appeared to be absent from this material.

It thus appears that the second wax product produced by the presently described process has a much more complex chemical composition than does the first wax product. In general, it is believed to consist principally of phenolic-fatty acid complexes of waxlike physical properties. Just as the first wax product is distinguishable from the corresponding wax product of my aforesaid patent application, Serial No. 18,878, now Patent No. 2,526,607, so the second wax product is distinguishable from the Wax II of the said application. This is evidenced, for example, by the very significant difference in saponification equivalents (200-210 for the former vs. 115-130 for the latter).

Next the bark from which the two above wax products had been removed was treated for the removal of dihydroquercetin. To this end, it was extracted with diethyl ether at about its boiling point. After removal of the ether solvent from the extract, there was obtained a 5 to 8% yield of dihydroquercetin in the form of white crystals melting at 228 to 230° C. Upon purification by dissolving it in hot water, decolorizing it with activated charcoal, and then recrystallizing, it was obtained in the form of long, white needles melting at 240 to 242° C. A similar product could be obtained by recrystallization of the crude product from a solvent comprising a mixture of alcohol and benzene. Upon oxidation of the dihydroquercetin with 10% sulphuric acid in the presence of air, quercetin melting at 312 to 314° C. was obtained.

Next the residue remaining in the extractor after the removal of the waxes and the dihydroquercetin was treated for the removal of tannin. This was accomplished by passing hot water (70 to 94° C.) through the bark in a series of wooden extraction tanks until further quantities of tannin were not removed thereby. The resulting tannin containing extract was applicable per se to the tanning of leather. When thus applied in the conventional manner, the leather produced was light in color, even colored, flexible, and well plumped. The tannin was obtained in a yield of between about 8% and 18% by weight, based on the weight of the bark, this yield not being affected materially by the extraction of the waxes and the dihydroquercetin prior to the removal of the tannin.

Bark remaining after the removal of the waxes, the dihydroquercetin, and the tannin was treated for the separation of the phlobaphenes which it contained. This was done by extracting the bark residue with ethyl alcohol at a temperature just below its boiling point. Upon evaporation of the alcohol solvent, there was obtained a residue of phlobaphenes in a yield of about 6% by weight based on the original weight of the dry bark. It was a dark brown, resinous material having thermoplastic properties making it suitable for use as an adhesive.

*Example II*

This example illustrates the application of the procedure of Figure 2.

Bark ground to pass a ⅜-inch screen and having a moisture content of about 45% by weight was extracted for three hours with benzene at a temperature of about 77° C. This resulted in the formation of a solution containing the first and second wax products and a solid residue (Bark Residue II) containing the dihydroquercetin, tannin, and phlobaphenes. This residue was further treated for the separation of its constituents in accordance with the procedure outlined fully in Example I and with the same results.

The solution containing the wax products, however, was heated to distill off the solvent, this leaving a solid residue comprising a mixture of the waxes. This residue then was extracted with petroleum naphtha (Skellysolve B) boiling between 140° and 150° F. for one hour. As a result, there was formed a naphtha solution of the first wax product from which the latter was obtained by evaporation of the solvent. The second wax product remained as an undissolved residue. These two wax products had the same properties as outlined in Example I.

*Example III*

This example illustrates the procedure of Figure 3.

Hogged bark having a moisture content of about 30% was covered with hot water in an extraction chamber, the ratio of water to bark being about 6.5 parts by weight water for each part of bark. The temperature of the water was maintained at between about 160° and about 200° F. After about four hours, the water extract was separated from the bark residue (Bark Residue VI).

The water extract, which contained the dihydroquercetin and the tannin, was placed in a vacuum evaporator and heated at 135° F. under a vacuum of 29 inches of mercury until its solids content reached a value of 50% by weight. The concentrate then was placed in a Liquid-liquid extractor and exhaustively extracted with diethyl ether at room temperature. This separated the dihydroquercetin from the tannin, the former being soluble in the ether and the latter remaining as an insoluble residue. The dihydroquercetin then was obtained as a solid product by evaporation of the ether from the solution.

Next the bark residue remaining after the removal of the dihydroquercetin and the tannin was extracted with hot benzene for a period of three hours. This separated a mixture of the first and second wax products (soluble) from a solid bark residue (Bark Residue IV). The mixture of wax products was separated into its constituents using the procedure outlined in Example II, and with the same results. The bark residue which contained the phlobaphenes was extracted with ethyl alcohol for removal of the phlobaphenes as outlined in Example I, and with the same results.

*Example IV*

This example illustrates the procedure of Figure 4.

Bark in the form of finely divided particles having a moisture content of under 30% by weight or air-dried was placed in a Soxhlet extractor and extracted with a constant boiling mixture of ethyl alcohol and benzene for a time period of 8 hours at 4 cycles per hour. This resulted in the removal of the wax, dihydroquercetin, tannin, and phlobaphene content of the bark, these constituents being soluble in the solvent employed. It left behind a bark residue (Bark Residue V) from which the extractive materials had been removed. The solution containing the extractive materials then was distilled to remove the solvent, leaving the extractive materials as a solid residue. The latter then was extracted batchwise three times with hot benzene at approximately its boiling point. This dissolved selectively the first and second wax products which thus were separated from a solid residue containing the dihydroquercetin, tannin, and phlobaphenes.

The solvent was removed by distillation from the wax solution, leaving as a solid residue the mixture of waxes. This residue was resolved into its components by the procedure outlined in Example II and with the same results.

The solid residue remaining after removal of the waxes then was extracted batchwise with diethyl ether at about its boiling point until extractive materials no longer were removed by this treatment. This separated the dihydroquercetin (soluble) from the tannin and phlobaphenes (insoluble). The dihydroquercetin was obtained in the solid form by evaporation of the ether solvent. The mixture of tannin and phlobaphenes was extracted with warm water (140° to 160° F.) this leaching out the tannin and leaving the phlobaphenes as a solid residue.

*Example V*

This example illustrates the application of the presently described process to the extraction of valuable materials from mechanically separated fractions of bark.

Douglas fir bark was ground in a hammer mill and then separated mechanically into three fractions viz. cork particles, needle-like bast fibers, and bark powder, the latter comprising the more readily pulverizable constituents of the bark. These fractions then were subjected to the extraction procedure substantially as outlined in Example I.

The cork fraction was extracted exhaustively with hot petroleum naphtha boiling between about 50° C. and about 72° C. Next, the residue was extracted with hot benzene. Then the residue remaining after the naphtha and benzene extractions was extracted with hot ether. These three operations resulted in the separation of solutions which, after removal of the solvent, yielded respectively 5.84% by weight of the first wax product, 2.50% by weight of the second wax product, and 19.0% by weight of dihydroquercetin. The coarse residue then was extracted with hot water at a temperature of 70° C. to 94° C. for the removal of tannin, which was obtained in a yield of 14.4% by weight. Thes residue left after these various extractions was composed of cork particles substantially free of extractive materials.

Next the bast fiber fraction was extracted for the recovery of its extractive content. First the fraction was screened to divide it into a subfraction containing the fibers of 40 to 60 mesh size, and one containing those of 60 to 80 mesh size. These fractions were extracted individually in a Soxhlet extractor first with benzene, and then with ether. The 40 to 60 mesh fraction yielded 3.83% by weight of a mixture of the first and second wax products upon extraction with benzene, and 1.60% by weight dihydroquercetin upon extraction with ether. The benzene extraction of the 60 to 80 mesh subfraction yielded 3.1% by weight of the wax mixture, and 1.5% by weight dihydroquercetin.

Next the bark powder fraction was processed. Upon extraction in a Soxhlet extractor with ether, it yielded 4.6% by weight of a mixture of the first and second wax products, and dihydroquercetin.

Thus it will be apparent that, by the process of the present invention, I have provided an integrated process for the recovery of a diversity of valuable products from the bark of trees, thereby transforming this waste product into a suitable raw material for a commercially attractive operation. The process results, furthermore, in the production of two new wax products and a new compound, dihydroquercetin. This makes available in very substantial quantities these new materials which are applicable to numerous uses. Still further, it results in the separation of the entire tannin and phlobaphene content of the bark in useful form, the yields of these materials not being affected by the prior removal of the other extractives.

Having now described my invention in preferred embodiments, I claim:

1. The process for the recovery of valuable products from the bark of trees which comprises treating the bark with a selective organic solvent for wax, thereby selectively separating the wax from the bark, and then treating the bark with a selective aqueous solvent for tannin, thereby selectively separating the tannin from the bark.

2. The process for the recovery of valuable products from the bark of trees which comprises treating the bark with a selective solvent for wax, thereby selectively separating the wax from the bark, treating the bark with a selective solvent for dihydroquercetin, thereby selectively separating dihydroquercetin from the bark, treating the bark with a selective solvent for tannin, thereby selectively separating tannin from the bark, and treating the bark with a selective solvent for phlobaphenes, thereby selectively separating phlobaphenes from the bark.

3. The process for the recovery of valuable wax products from the barks of trees which comprises extracting bark with a lower aliphatic hydrocarbon solvent, thereby separating from the bark a first wax product which is soluble in the said lower aliphatic hydrocarbon solvent, and extracting the bark from which the said first wax product has been removed with at least one solvent of the class consisting of the aromatic hydrocarbons which are fluid at ordinary temperatures and pressures and the lower halogenated aliphatic hydrocarbons, thereby selectively separating from the bark a second wax product which is soluble in the normally fluid aromatic hydrocarbons and the lower halogenated aliphatic hydrocarbons.

4. The process for the recovery of valuable wax products from the barks of trees which comprises extracting the bark with a solvent comprising petroleum naphtha, thereby selectively separating from the bark a first wax product which is soluble in petroleum naphtha, and thereafter extracting the bark with a solvent comprising benzene, thereby selectively separating from the bark a second wax product which is soluble in benzene.

5. The process for the recovery of valuable products from the bark of trees which comprises extracting the bark with a solvent comprising a lower aliphatic hydrocarbon, thereby separating from the bark a first wax product, extracting the bark from which the said first wax product has been removed with at least one solvent of the class consisting of the normally liquid aromatic hydrocarbons and the lower halogenated aliphatic hydrocarbons, thereby selectively removing from the bark a second wax product, and extracting the bark from which the said first and second wax products have been removed with a lower alkyl ether, thereby selectively removing dihydroquercetin from the bark.

6. The process for the recovery of valuable products from the bark of trees which comprises extracting the bark with at least one member of the class consisting of the normally liquid aromatic hydrocarbons and the lower halogenated aliphatic hydrocarbons, thereby separating from the bark a mixture of waxes, and extracting the bark from which the said mixture of waxes has been removed with a lower alkyl ether, thereby selectively separating dihydroquercetin from the bark.

7. The process for the recovery of valuable products from the bark of trees which comprises extracting the bark with a lower aliphatic hydrocarbon solvent comprising petroleum naphtha, thereby separating therefrom a first wax product, extracting the bark from which the first wax product has been removed with a solvent comprising benzene, thereby separating therefrom a second wax product, and extracting the bark from which the said first and second wax products have been removed with a solvent comprising diethyl ether, thereby selectively separating dihydroquercetin therefrom.

8. The process for the recovery of valuable products from the bark of trees which comprises extracting the bark with a first solvent comprising at least one member of the class consisting of the normally liquid aromatic hydrocarbons and the lower halogenated aliphatic hydrocarbons, thereby selectively separating a mixture of waxes from the bark, extracting the bark from which the said mixture of waxes has been removed with a second solvent comprising a lower alkyl ether, thereby selectively separating dihydroquercetin from the bark, and extracting with an aqueous solvent the bark from which the said mixture of waxes and dihydroquercetin have been removed, thereby selectively removing tannin from the bark.

9. The process of claim 8 in which the first solvent comprises benzene, and the second solvent comprises diethyl ether.

10. The process for the recovery of valuable products from the bark of trees which comprises selectively extracting the bark with a first solvent comprising a lower aliphatic hydrocarbon, thereby selectively separating a first wax product therefrom, extracting the bark from which the first wax product has been removed with a second solvent comprising at least one member of the group consisting of the normally liquid aromatic hydrocarbons and the lower halogenated aliphatic hydrocarbons, thereby selectively separating a second wax product from the bark, extracting the bark from which the said first and second wax products have been removed with a third solvent comprising a lower alkyl ether, thereby selectively separating dihydroquercetin from the bark, and extracting the bark from which the said first and second waxes and the dihydroquercetin have been removed with an aqueous solvent, thereby selectively removing tannin from the bark.

11. The process of claim 10 wherein the first solvent is petroleum naphtha, the second solvent is benzene, and the third solvent is diethyl ether.

12. The process for the recovery of valuable products from the bark of trees which comprises selectively extracting the bark with a first solvent comprising a lower aliphatic hydrocarbon, thereby selectively separating a first wax product therefrom, extracting the bark from which the first wax product has been removed with a second solvent comprising at least one member of the group consisting of the normally liquid aromatic hydrocarbons and the lower halogenated aliphatic hydrocarbons, thereby selectively separating a second wax product from the bark, extracting the bark from which the said first and second wax products have been removed with a third solvent comprising a lower alkyl ether, thereby selectively separating dihydroquercetin from the bark, extracting the bark from which the said first and second waxes and the dihydroquercetin have been removed with an aqueous solvent, thereby selectively removing tannin from the bark, and extracting the bark from which the said first and second wax products, the dihydroquercetin, and the tannin have been removed with a lower aliphatic alcohol, thereby selectively separating phlobaphenes from the bark.

13. The process of claim 12 wherein the first solvent comprises petroleum naphtha, the second solvent comprises benzene, the third solvent comprises diethyl ether, and the solvent employed for the extraction of the phlobaphenes comprises ethanol.

14. The process for the recovery of valuable products from the bark of trees which comprises extracting the bark with a first solvent comprising at least one member of the group selected from the normally liquid aromatic hydrocarbons and the lower halogenated aliphatic hydrocarbons, thereby selectively separating a mixture of waxes therefrom, extracting the bark from which the said mixture of waxes has been removed with an aqueous solvent, thereby selectively separating from the bark a mixture comprising dihydroquercetin and tannin, and extracting the mixture of dihydroquercetin and tannin with a lower alkyl ether, thereby separating the dihydroquercetin (soluble) from the tannin (insoluble).

15. The process of claim 14 wherein the first solvent comprises benzene and the solvent employed for the separation of dihydroquercetin and the tannin comprises diethyl ether.

16. The process for the recovery of valuable products from the bark of trees which comprises selectively extracting the bark with a first solvent comprising at least one member of the group consisting of the normally liquid aromatic hydrocarbons and the lower halogenated aliphatic hydrocarbons, thereby selectively separating from the bark a mixture of waxes, removing the solvent from the said mixture of waxes, extracting the resulting wax mixture with a second solvent comprising a lower aliphatic hydrocarbon, thereby selectively separating a first wax product (soluble) from a second wax product (insoluble), extracting the bark residue remaining after the removal of the said wax mixture with an aqueous solvent, thereby selectively extracting from the bark a mixture comprising dihydroquercetin and tannin, extracting the said mixture of dihydroquercetin and tannin with a third solvent comprising a lower alkyl ether, thereby separating the dihydroquercetin (soluble) from the tannin (insoluble), and extracting the bark from which the said mixture of waxes and the said mixture of dihydroquercetin and tannin have been removed with a fourth solvent comprising a lower aliphatic alcohol, thereby selectively removing phlobaphenes from the bark.

17. The process for the recovery of valuable products from the bark of trees which comprises selectively extracting the bark with an aqueous solvent, thereby selectively removing therefrom a mixture comprising dihydroquercetin and tannin, extracting the bark from which the said mixture of dihydroquercetin and tannin have been removed with a first solvent comprising at least one member of the group selected from the normally liquid aromatic hydrocarbons and the lower halogenated aliphatic hydrocarbons, thereby selectively separating from the bark a mixture of waxes, and extracting the bark from which the said mixture of dihydroquercetin and tannin and the said mixture of waxes have been removed with a second solvent comprising a lower aliphatic alcohol, thereby selectively separating phlobaphenes from the bark.

18. The process for the recovery of valuable products from the bark of trees which comprises selectively extracting the bark with a first solvent comprising at least one member of the group consisting of the lower aliphatic alcohols, the lower aliphatic ketones, and the lower aliphatic ethers thereby selectively separating from the bark a mixture comprising waxes, dihydroquercetin, and tannin, extracting the said mixture with a second solvent comprising at least one member of the class consisting of the normally liquid aromatic hydrocarbons and the lower halogenated aliphatic hydrocarbons, thereby selectively separating a mixture of waxes (soluble) from a mixture of dihydroquercetin and tannin (insoluble), and extracting the said mixture of waxes with a third solvent comprising a lower aliphatic hydrocarbon thereby selectively separating a first wax product (soluble) from a second wax product (insoluble).

19. The process for the recovery of valuable products from the bark of trees which comprises selectively extracting the bark with a first solvent comprising at least one member of the group consisting of the lower aliphatic alcohols, the lower aliphatic ketones, and the lower aliphatic ethers thereby selectively separating from the bark a mixture comprising waxes, dihydroquercetin, phlobaphenes, and tannin, extracting the said mixture with a second solvent comprising at least one member of the class consisting of the normally liquid aromatic hydrocarbons and the lower halogenated aliphatic hydrocarbons, thereby selectively separating a mixture of waxes (soluble) from a mixture of dihydroquercetin phlobaphenes and tannin (insoluble), extracting the said mixture of waxes with a third solvent comprising a lower aliphatic hydrocarbon thereby selectively separating a first wax product (soluble) from a second wax product (insoluble), and extracting the said mixture of dihydroquercetin phlobaphenes and tannin with a fourth solvent comprising a lower alkyl ether, thereby separating the dihydroquercetin (soluble) from the phlobaphenes and tannin (insoluble).

20. The process for the recovery of valuable products from the bark of trees which comprises separating from the bark its content of cork, treating the cork with a selective organic solvent for wax, thereby selectively separating the wax from the cork, and treating the cork with a selective solvent for dihydroquercetin, thereby selectively separating the dihydroquercetin from the cork.

21. The process for the recovery of valuable products from the bark of trees which comprises separating from the bark its content of cork, treating the cork with a selective organic solvent for wax, thereby selectively separating the wax from the cork, and separating the resulting wax solution from the resulting cork residue.

22. The process for the recovery of valuable products from the bark of trees which comprises separating from the bark its content of bast fiber, treating the bast fiber with a selective organic solvent for wax, thereby selectively separating the wax from the bast fiber, and separating the resulting wax solution from the resulting bast fiber residue.

23. The process for the recovery of valuable products from the bark of trees which comprises separating from the bark its content of bark powder, treating the bark powder with a selective organic solvent for wax, thereby selectively separating the wax from the bark powder, and separating the resulting wax solution from the resulting bark powder residue.

24. The process for the recovery of valuable wax products from the bark of trees which comprises reducing the bark to the form of small pieces, extracting the bark pieces with a selective organic solvent for wax, thereby separating from the bark a wax product which is soluble in the said solvent, and separating the resulting wax solution from the residue comprising solvent-extracted bark.

25. The process for the recovery of valuable wax products from the bark of trees which comprises reducing the bark to the form of small pieces, extracting the bark pieces with a lower aliphatic hydrocarbon solvent, thereby separating from the bark a wax product which is soluble in the said lower aliphatic hydrocarbon solvent, and separating the resulting wax solution from the residue comprising solvent-extracted bark.

26. The process of claim 25 wherein the lower aliphatic hydrocarbon solvent comprises petroleum naphtha.

27. The process for the recovery of valuable products from the bark of trees which comprises reducing the bark to the form of small pieces, extracting the pieces of bark with a solvent comprising at least one member of the group selected from the normally liquid aromatic hydrocarbons and the lower halogenated aliphatic hydrocarbons, thereby selectively separating a mixture of waxes from the bark, and separating the resulting wax-containing solution from the resulting solvent-extracted bark residue.

28. The process of claim 27 wherein the solvent comprises a normally liquid aromatic hydrocarbon.

29. The process of claim 27 wherein the solvent comprises benzene.

30. The process of claim 27 wherein the solvent comprises a halogenated aliphatic hydrocarbon.

31. The process of claim 27 wherein the solvent comprises trichlorethylene.

32. The process of claim 27 wherein the solvent comprises carbon tetrachloride.

33. The process for the recovery of valuable products from the bark of trees which comprises selectively extracting the bark with a first solvent comprising at least one member of the group consisting of the normally liquid aromatic hydrocarbons and the lower halogenated aliphatic hydrocarbons, thereby selectively separating from the bark a mixture of waxes, removing the solvent from the said mixture of waxes, and extracting the resulting wax mixture with a second solvent comprising a lower aliphatic hydrocarbon, thereby selectively separating a first wax product (soluble) from a second wax product (insoluble).

34. The process of claim 33 wherein the first solvent comprises benzene and the second solvent comprises petroleum naphtha.

35. The process of claim 33 wherein the first solvent comprises trichlorethylene and the second solvent comprises petroleum naphtha.

36. The process for the recovery of valuable products from the bark of trees which comprises selectively extracting the bark with an aqueous solvent, thereby selectively removing therefrom a mixture comprising dihydroquercetin and tannin, and extracting the bark from which the said mixture of dihydroquercetin and tannin have been removed with a solvent comprising at least one member of the group selected from the normally liquid aromatic hydrocarbons and the lower halogenated aliphatic hydrocarbons, thereby selectively separating a wax product from the bark.

37. The process of claim 36 wherein the solvent comprises a normally liquid aromatic hydrocarbon.

38. The process of claim 36 wherein the solvent comprises benzene.

39. The process of claim 36 wherein the solvent comprises a lower halogenated aliphatic hydrocarbon.

40. The process of claim 36 wherein the solvent comprises trichlorethylene.

41. The process for the recovery of valuable products from the bark of trees which comprises selectively extracting the bark with a first solvent comprising at least one member of the group consisting of the lower aliphatic alcohols, the lower aliphatic ketones, and the lower aliphatic ethers thereby selectively separating from the bark a mixture comprising waxes, dihydroquercetin phlobaphenes, and tannin, and extracting the said mixture with a solvent comprising at least one member of the class consisting of the normally liquid aromatic hydrocarbons and the lower halogenated aliphatic hydrocarbons, thereby selectively separating a mixture of waxes (soluble) from a mixture of dihydroquercetin phlobaphenes and tannin (insoluble).

42. The process for the recovery of valuable products from the bark of trees which comprises extracting the bark with a solvent comprising the constant boiling mixture of ethyl alcohol and benzene, thereby selectively separating from the bark a mixture comprising waxes, dihydroquercetin and tannin.

ERVIN F. KURTH.

References Cited in the file of this patent

UNITED STATES PATENTS

| Number | Name | Date |
|--------|------|------|
| 4,007 | Close et al. | Apr. 22, 1845 |
| 510,132 | Hagemann | Dec. 5, 1893 |
| 531,752 | Schweitzer | Jan. 1, 1895 |
| 601,170 | Rau | Mar. 22, 1898 |
| 2,423,020 | Haun | June 24, 1947 |
| 2,446,551 | Pauley | Aug. 10, 1948 |
| 2,526,607 | Kurth | Oct. 17, 1950 |

OTHER REFERENCES

Roux: J. Soc. Leather Trade Chem., November 1949, pages 399–404, 6 pages.

Leather Chemists Association J., August 1949, pages 606–609.

Leather Chemists Association J., February 1947, pages 47–61.